United States Patent Office 3,190,529
Patented June 22, 1965

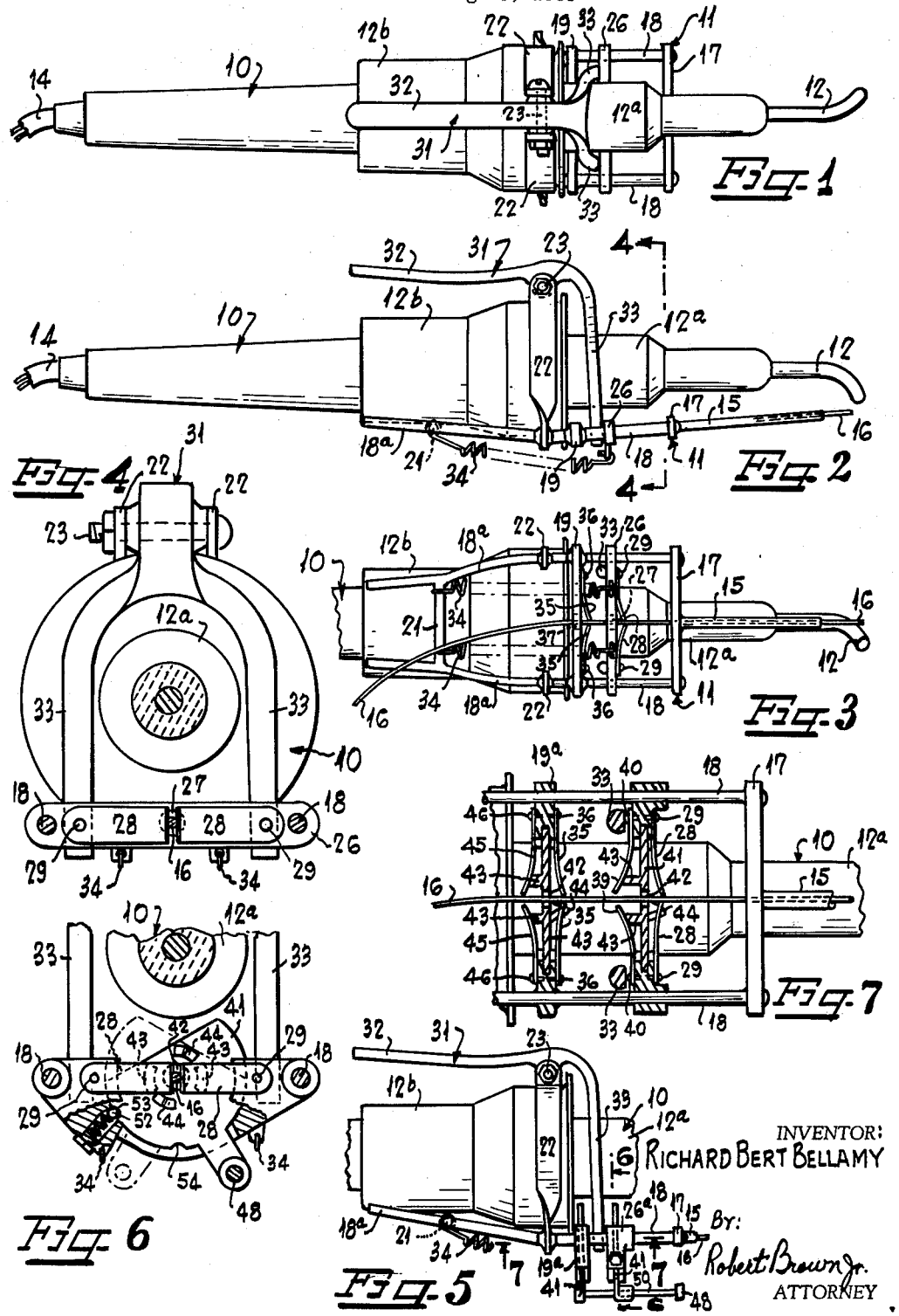

3,190,529
SOLDER STRIP FEEDING ATTACHMENT
FOR SOLDERING IRONS
Richard Bert Bellamy, State Park, Myrtle Beach, S.C.
Filed Feb. 8, 1963, Ser. No. 257,145
3 Claims. (Cl. 228—53)

This invention relates to soldering apparatus and more especially to an attachment capable of either advancing a solder strip toward or retracting it from the tip of a soldering iron.

It is an object of this invention to provide an attachment of the class mentioned which will enable an operator to perform with one hand the dual function of advancing or retracting the solder while controlling the position of the iron, thereby freeing his other hand for other purposes.

It is another object of this invention to provide a compact and relatively light-weight solder-feeding device for use in soldering small electrical parts in electronic plants where excessive weight or size of the device is a critical factor adversely affecting the quality and production of the operator.

It is another object of this invention to provide a novel combination of a one-way solder strip advancer reciprocably mounted upon a solder iron, and a trigger having a movable portion thereof slidably engageable with, but disconnected from the advancer as the latter is advanced by the trigger portion. By providing sliding engagement between the trigger portion and the advancer the lateral components of the force applied to and acting along the path of movement of the advancer are substantially reduced, resulting in a corresponding reduction in the weight and size of the framework upon which the advancer is movably mounted.

It is another object of this invention to provide a solder feeding attachment equipped with means for retracting a solder strip, in combination with means for selectively operating the feeding and retracting means.

It is a further object of this invention to provide an attachment of the class described capable of being readily attached to or detached from a soldering iron and which may be sold either as a separate unit or as a part of the iron.

It is yet another object of this invention to provide a selectively operable solder strip feeding and retracting attachment which is easy to operate, economical to manufacture, and which requires a minimum of maintenance.

It is a still further object of this invention to provide a novel double track mounting for the aforesaid reciprocable solder strip advancing member in combination with an independently movable trigger mechanism having a double or two-point contact with the advancing member respectively at the two tracks.

Some of the objects of invention having been stated, other objects will appear as the description proceeds when taken in connection with the accompanying drawings, in which:

FIGURE 1 is a plan view of a soldering iron equipped with my improved solder feeding device;

FIGURE 2 is a side elevation of FIGURE 1;

FIGURE 3 is a bottom view of a portion of FIGURE 2;

FIGURE 4 is an enlarged transverse sectional view taken along line 4—4 in FIGURE 2;

FIGURE 5 is a fragmentary side elevation, similar to the central portion of FIGRE 2, but showing a modified embodiment of the invention also equipped with a solder strip retracting mechanism;

FIGURE 6 is an enlarged vertical sectional view taken along the line 6—6 in FIGURE 5, and FIGURE 7 is an enlarged sectional view taken along the line 7—7 in FIGURE 5.

Referring more particularly to the drawings, the numeral 10 indicates a conventional soldering iron upon which is removably mounted my improved solder feeding device broadly designated by numeral 11. The soldering iron 10 is elongated and comprises a soldering tip 12 supported at the forward end of a heating unit 12a which, in turn, has its rearward end supported by a handle 12b. The unit and tip may be heated electrically in a well known manner by electricity supplied through conduit 14 connected at the rearward portion of the handle.

A guide tube 15 is supported longitudinally alongside iron 10 and has one end thereof disposed adjacent the tip 12, said tube being constructed and arranged to present one end of a solder strip 16 to the tip during a soldering operation. The other end of tube 15 is cantilevered from a stationary bar 17 arranged transversely of the longitudinal axis of the soldering iron. Opposite ends of bar 17 are fixedly secured respectively to the ends of a pair of parallel rod portions 18 upon which a strip advancing and retracting mechanism hereinafter described is adapted to reciprocate. Another transverse bar 19 is disposed in spaced parallel relation to the bar 17 and cooperates with bar 17 to rigidly and precisely maintain portions 18 parallel to one another as well as substantially parallel to the longitudinal axis of guide tube 15.

The aforementioned members 17, 18 and 19 constitute a rectangular open framework for supporting the previously described guide 15 and also the hereinafter described one-way solder strip advancer and its cooperating locking mechanism for preventing reverse movement of the strip while the advancer retracts. This framework is positioned alongside heating unit 12a and is detachably secured to handle 12b by means of: a pair of rod extensions 18a integral with portions 18, a transverse bar 21 connecting said extensions and fitting against handle 12b, a pair of arcuate bands 22 respectively connected to extensions 18a at points adjacent the opposite ends of transverse bar 19 and extending around opposite sides of said handle, and a bolt 23 connecting the extended ends of the bands.

It will be observed that bar 19 and the two bands 22 combine to form a continuous member encircling the handle 12b.

The solder strip advancing member comprises: a bar 26 arranged transversely of and reciprocably mounted upon the straight parallel rod portions 18, said bar having an opening 27 therethrough alined with guide tube 15 and adapted to receive solder strip 16; and a gripping element consisting of a pair of spring fingers 28, each having one end thereof fixedly secured to bar 26 as at 29 (FIGURES 3 and 4). The other ends of fingers 28 are freely movable and normally terminate in abutting relationship at a point adjacent the strip opening 27 when the strip 16 is not present. When, however, the strip is disposed between the free ends of fingers 28, the finger ends will be further deflected forwardly and will rigidly resist rearward movement of the strip. Therefore, the strip will be rectilinearly advanced forwardly upon forward movement of the fingers.

The bar 26 and its associated fingers 28 are adapted to be moved forwardly toward tip 12 by means of an L-shaped trigger or lever 31 pivoted intermediate its ends upon the previously mentioned bolt 23. One end portion of the trigger is bifurcated thereby forming two legs 33, and the other end portion of the lever comprises a handle 32 extending alongside the solder iron handle 12b. Legs 33 straddle heating unit 12a transversely and have their ends slidably contacting or pressing against the bar 26 at two points respectively adjacent rod portions 18. When the handle 32 of the trigger 31 is manually pressed toward handle 12b (FIGURES 2 and 4), the ends of legs 33 will be moved in an arc about bolt 23 while pressing bar 26 in a straight line to advance the strip 16. Hence it will be observed that there will be a sliding contact between legs 33 and bar 26 but without any connection between them.

At least one tension spring 34 is provided to exert a rearward pull upon bar 26 to normally hold the latter in sliding contact with legs 33. Springs 34 therefore serve to return the bar and trigger to the retracted position shown in the drawings when the pressure is released upon handle 32.

While the bar 26 and finger 28 are moving from an advanced to a retracted position, the free ends of a second pair of spring fingers 35 will engage opposite sides of strip 16 to lock it in advanced position. Fingers 35 are secured as at 36 to the face of transverse stationary 19 and are mounted thereon in the same manner as that described in connection with the mounting of fingers 28. Bar 19 is provided with an opening 37 for receiving strip 16, said opening being disposed adjacent the free ends of fingers 35 and alined with the opening 27 and the guide tube 15.

FIGURES 5, 6 and 7 illustrate a strip advancing attachment substantially identical to the previously described embodiment of invention, but with the added provision of means for rendering inoperative the advancing gripping element or spring fingers 28 and their operatively associated locking fingers 35, and a second gripping means for intermittently retracting the strip while the fingers are in inoperative position. Accordingly, like reference characters will be employed to designate like or identical parts without further description of them.

The solder strip retracting means includes a bar 26a reciprocably mounted upon rod portions 18, said bar having the previously described gripping element consisting of pair of strip advancing fingers 28 on one face thereof and the second gripping element consisting of an additional pair strip retracting spring fingers 39 mounted on the opposite face as at 40 and adapted to rigidly engage the strip during its retraction. A disk 41, having a centrally disposed hole 42 for receiving strip 16, is rotatably mounted in bar 26a. The disk 41 has a pair of cams 43 on one of its faces and engageable with the spring fingers 39 to hold the free ends thereof out of engagement with strip 16 during advancement of the latter by the fingers 28 (FIGURES 6 and 7). The opposite face of disk 41 has a second pair of cams 44, alternately operable with cams 43 and engageable respectively with the free ends of spring fingers 28 to hold them out of engagement with strip 16 while the fingers 39 operate to retract the strip.

Similarly, the fixed transverse bar 19a has the previously described locking fingers 35 on one face thereof which cooperate with the strip advancing fingers 28 on reciprocable bar 26a as the strip is advanced. On the opposite face of bar 19a is mounted an additional pair of spring fingers 45 as at 46, the free ends of said fingers adapted to cooperate with retracting fingers 39 to prevent forward movement of the strip during a strip retracting operation. Also rotatably mounted on bar 19a is another of the previously described disks 41 having a pair of cams 43 on one face thereof for engaging the free ends of fingers 45 to hold them in the disengaged position shown in FIGURE 7 during advancement of strip 16; and another pair of cams 44 are mounted on the opposite face of disk 41 and alternately operable with the cams 43 to hold fingers out of engagement with the strip during retraction of the latter.

It will be noted in FIGURE 5 that the left-hand disk 41 has a horizontally disposed pin 50 extending therefrom and slidably penetrating the lowermost portion of the right-hand disk 41 to thereby permit relative movement between the two disks during reciprocation of member 26a. When it is desired to advance the strip 16, the disks 41 are rotated to bold-line position as shown in FIGURE 6; and when desired to retract the strip, the disks are rotated to the dot-dash line position. The two disks may be held in either of the two positions by suitable means such as spring-pressed balls 52 releasably engageable with peripheral notches 53 or peripheral notches 54 in the disks, depending upon whether advancement or retraction of strip 16 is desired.

What I claim as new and desire to secure by Letters Patent of the United States is:

1. In a soldering device having an elongated heating unit, a soldering tip at the forward end of said unit and a handle at the rear end thereof, selectively operable mechanism for intermittently advancing and retracting a solder strip relative to said tip comprising: gripping means movable forwardly toward and rearwardly away from said tip, said means being rigidly engageable with said strip upon said forward movement and slidably engageable with the strip upon said rearward movement, a second gripping means movable forwardly toward and rearwardly away from said tip, said second means being rigidly engageable with said strip upon said last-named rearward movement and slidably engageable with the strip upon said last-named forward movement, a fixedly mounted third gripping means slidably engageable with said strip upon forward movement of said first gripping means and rigidly engageable with the strip upon rearward movement of the first gripping means, means for concurrently rendering said first and third gripping means operative and said second gripping means inoperative whereby the strip may be intermittently advanced, and means operable alternately with said concurrently rendering means for concurrently rendering said first and third gripping means inoperative and said second gripping means operative whereby the strip may be intermittently retracted.

2. In a soldering device, an elongated heating unit, a soldering tip at the forward end of said unit, and a handle at the rearward end of the unit, selectively operable mechanism for intermittently advancing and retracting a solder strip relative to said tip comprising: a pair of straight parallel rods spaced apart and extending longitudinally alongside said heating unit, a bar disposed transversely of said unit and mounted for rectilinear movement upon said rods forwardly toward and rearwardly from said tip, opposed gripping means mounted on said bar substantially midway between said rods, said means being rigidly engageable respectively with opposite sides of the strip upon forward movement of the bar and slidably engageable upon the rearward movement thereof, a fixedly mounted second gripping means slidably engageable with said strip upon the forward movement of the bar and rigidly engageable with the strip upon rearward movement of the bar, a third gripping means movable forwardly toward and rearwardly from said tip, said third means being rigidly engageable with the strip upon its rearward movement and slidably engageable with the strip upon its forward movement, a fixedly mounted fourth gripping means slidably engageable with said strip upon rearward movement of said third gripping means and fixedly engageable with the strip upon forward movement of the latter gripping means, means for concurrently rendering said first and second gripping means operative and said third and fourth gripping means inoperative whereby the strip may be intermittently advanced, and means operable alternately with said last-named means for rendering said first and second gripping means inoperative and said third and fourth gripping means operative whereby the strip may be intermittently retracted.

3. In a soldering device, an elongated heating unit, a soldering tip at the forward end of said unit, and a handle at the rearward end of the unit, mechanism for intermittently advancing a solder strip toward said tip comprising: a rigid rectangular framework having a substantially rectangular opening therein, two of the opposed sides of said opening being bounded respectively by a pair of straight parallel spaced rods extending longitudinally of said heating unit and the other two opposed sides of the opening being bounded by two spaced transverse bars respectively disposed forwardly toward and rearwardly from said tip, a third transverse bar disposed between said two spaced bars and mounted for rectilinear movement upon said rods toward and away from said tip, opposed gripping means mounted on said third bar substantially midway between said rods, said means being rigidly engageable respectively with opposite sides of the strip upon forward movement of the third bar and slidably engageable upon rearward movement thereof, a second opposed gripping means mounted on said rearwardly disposed transverse bar, said second gripping means being rigidly engageable respectively with opposite sides of the strip upon rearward movement of the third bar and slidably engageable upon forward movement of the third bar, means carried by said forwardly disposed transverse bar and alined with said first and second gripping means for guiding said solder strip toward the tip, and an L-shaped pivoted trigger having a forked end portion straddling said unit transversely and the ends of said fork being slidably engageable with said third bar at two points respectively adjacent said pair of rods, the opposite end portion of said trigger extending alongside said handle from said pivot, whereby the lateral components of the forces advancing said strip will be substantially eliminated by said two-point sliding engagement between said third bar and said forked ends.

References Cited by the Examiner
UNITED STATES PATENTS

| | | | |
|---|---|---|---|
| 1,951,545 | 3/34 | Carson | 113—111 |
| 2,058,634 | 10/36 | Rusk | 113—199 |
| 2,604,571 | 7/52 | Naulty et al. | 113—199 |
| 3,068,826 | 12/62 | Meader et al. | 113—199 |

CHARLES W. LANHAM, *Primary Examiner.*